United States Patent
Tan et al.

(10) Patent No.: US 8,164,297 B2
(45) Date of Patent: Apr. 24, 2012

(54) POWER CONVERTER AND MOTOR DRIVING SYSTEM

(75) Inventors: Daisuke Tan, Mito (JP); Masahiro Tobise, Hitachinaka (JP); Hirohisa Satomi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 384 days.

(21) Appl. No.: 12/557,967

(22) Filed: Sep. 11, 2009

(65) Prior Publication Data

US 2010/0231150 A1 Sep. 16, 2010

(30) Foreign Application Priority Data

Sep. 12, 2008 (JP) .................... 2008-234499

(51) Int. Cl.
*H02P 27/04* (2006.01)
(52) U.S. Cl. ......... 318/807; 318/808; 318/813; 363/131
(58) Field of Classification Search .......... 318/800, 318/801, 807, 808, 812, 813; 363/34, 123, 363/131
See application file for complete search history.

(56) References Cited

U.S. PATENT DOCUMENTS

| 4,210,948 | A | * | 7/1980 | Waltz | 361/76 |
| 7,541,758 | B2 | * | 6/2009 | Inaba et al. | 318/140 |
| 2006/0186892 | A1 | * | 8/2006 | Hiramatsu et al. | 324/500 |
| 2008/0054839 | A1 | * | 3/2008 | Sasaki et al. | 318/724 |

FOREIGN PATENT DOCUMENTS

JP 08-331750 12/1996

OTHER PUBLICATIONS

B.K. Boss, "Power Electronics & AC Drives", 7 pages.

* cited by examiner

*Primary Examiner* — Bentsu Ro
(74) *Attorney, Agent, or Firm* — Antonelli, Terry, Stout & Kraus, LLP.

(57) ABSTRACT

An object of the present invention is to provide a power converter in which the open-phase can be detected in a broader frequency region even if a predetermined relation is kept between the output voltage and the frequency. In order to achieve the above objects, a power converter including: an inverter unit having phase unit inverters provided with a plurality of multiple connected single-phase cell inverters for every phase; an inverter controller for controlling the inverter unit so that a predetermined relation is kept between an output voltage and a frequency; and a plurality of transformers for detecting output voltages of the plurality of phase unit inverters, in which the inverter controller is provided with a fault detection unit for detecting whether a phase-to-phase voltage deviation calculated by the output voltage is within range of an allowable voltage deviation calculated as a function of the frequency is provided.

15 Claims, 6 Drawing Sheets

POWER CONVERTER AND MOTOR DRIVING SYSTEM

CROSS REFERENCE TO RELATED APPLICATIONS

The present application claims benefit of the filing date of Japanese Patent Application No. 2008-234499 filed on Sep. 12, 2008 which is incorporated herein by reference.

FIELD OF THE INVENTION

The present invention relates to a power converter which includes multiple connected single-phase cell inverters and detects an open-phase, and a motor driving system using the same.

DESCRIPTION OF THE RELATED ART

Multiple connected variable frequency power supply (power converter) is connected to a three-phase induction motor so as to control a rotational speed of the three-phase induction motor at a target frequency.

Three-phase connected variable frequency power supply generally detects an abnormality such as an overvoltage or an overcurrent, and does not detect an open-phase. However, when the open-phase occurs, a load is damaged seriously and a large torque ripple, etc. may occur. Therefore, it is necessary to detect the open-phase.

FIG. 6 is a block diagram of a power converter having the ability to detect the open-phase described in JP 8-331750 A. In FIG. 6, an open-phase detecting system 120 of an inverter includes a direct-current power supply 51, an inverter 52 for converting a direct-current power to a three-phase alternating current power, an alternating current filter 53, an output transformer 55 for generating a three-phase output voltage, a load 60 connected to an output of the output transformer 55, a transformer 54 for detecting an instantaneous voltage of a three-phase alternating voltage output from the output transformer 55, a rectifier 56 for rectifying a three-phase alternating current corresponding to the detected instantaneous voltage, an A/D converter 57 for converting an analog value of a three-phase voltage obtained by rectifying to a digital value, a microcomputer 58, and a PWM pulse generator 59 for controlling the inverter 52. In addition, the alternating current filter 53 includes a three-phase choking coil 48 and a filter capacitor 49, and outputs a fundamental wave component.

In a technique described in JP 8-331750 A, the microcomputer 58 detects the open-phase by calculating an average value of the digital values converted by the A/D converter 57 and detecting that the average value continues out of a predetermined level for more than a predetermined period. Also, the microcomputer 58 detects the open-phase by performing Fast Fourier Transform (FFT) and power spectrum processing of the converted digital value, calculating an effective value of harmonics and a distortion factor, and detecting that the distortion factor more than a predetermined level continues for more than a predetermined period.

Also, B. K. Bose, "Power Electronics and Ac Drives" discloses a motor controlling technique in which a magnetic flux in an air gap of an induction motor is kept constant and a torque sensitivity for a stator current is maximized by inputting a voltage instruction via a V/f (applied voltage V/applied frequency f) gain.

Here, the control of the three-phase induction motor connected to the inverter 52 disclosed in JP 8-331750 A using the motor controlling technique disclosed in Bose is considered.

In this case, because an output voltage of the inverter (power converter) depends on a rotational speed (frequency) of the three-phase induction motor, a judging level for judging the open-phase of the power converter is a level determined before operation. For this reason, when the judging level is adjusted to the maximum rotational speed, a minimum rotational speed may not exceed the judging level even if the open-phase occurs in the power converter. On the contrary, when the judging level is adjusted to the minimum rotational speed, the maximum rotational speed may exceed the judging level even if the open-phase does not occur in the power converter. Therefore, there arises a problem that there are some rotational speed (frequency) regions in which the open-phase can not be detected.

The present invention aims to solve the above problem. Therefore, an object of the present invention is to provide a power converter in which the open-phase can be detected in a broader frequency region even if a predetermined relation is kept between the output voltage and the frequency. Another object of the present invention is to provide a motor driving system using the power converter.

SUMMARY OF THE INVENTION

In order to achieve the above objects, a power converter according to the present invention includes: an inverter unit (1) having phase unit inverters (10, 20, . . . ) provided with a plurality of multiple connected single-phase cell inverters (10a, 10b, . . . ) for every phase; an inverter controller (3) for controlling the inverter unit so that a predetermined relation is kept between an output voltage and a frequency; and a plurality of transformers (4a, 4b, 4c) for detecting output voltages of the plurality of phase unit inverters, in which the inverter controller is provided with a fault detection unit for detecting whether a phase-to-phase voltage deviation calculated by the output voltage is within a range of an allowable voltage deviation calculated as a function of the frequency. In addition, numbers in parentheses are merely examples.

BRIEF DESCRIPTION OF THE DRAWINGS

The objects and features of the present invention will become more readily apparent from the following detailed description taken in conjunction with the accompanying drawings in which.

DETAILED DESCRIPTION OF THE INVENTION (First Embodiment)

Figure 1:
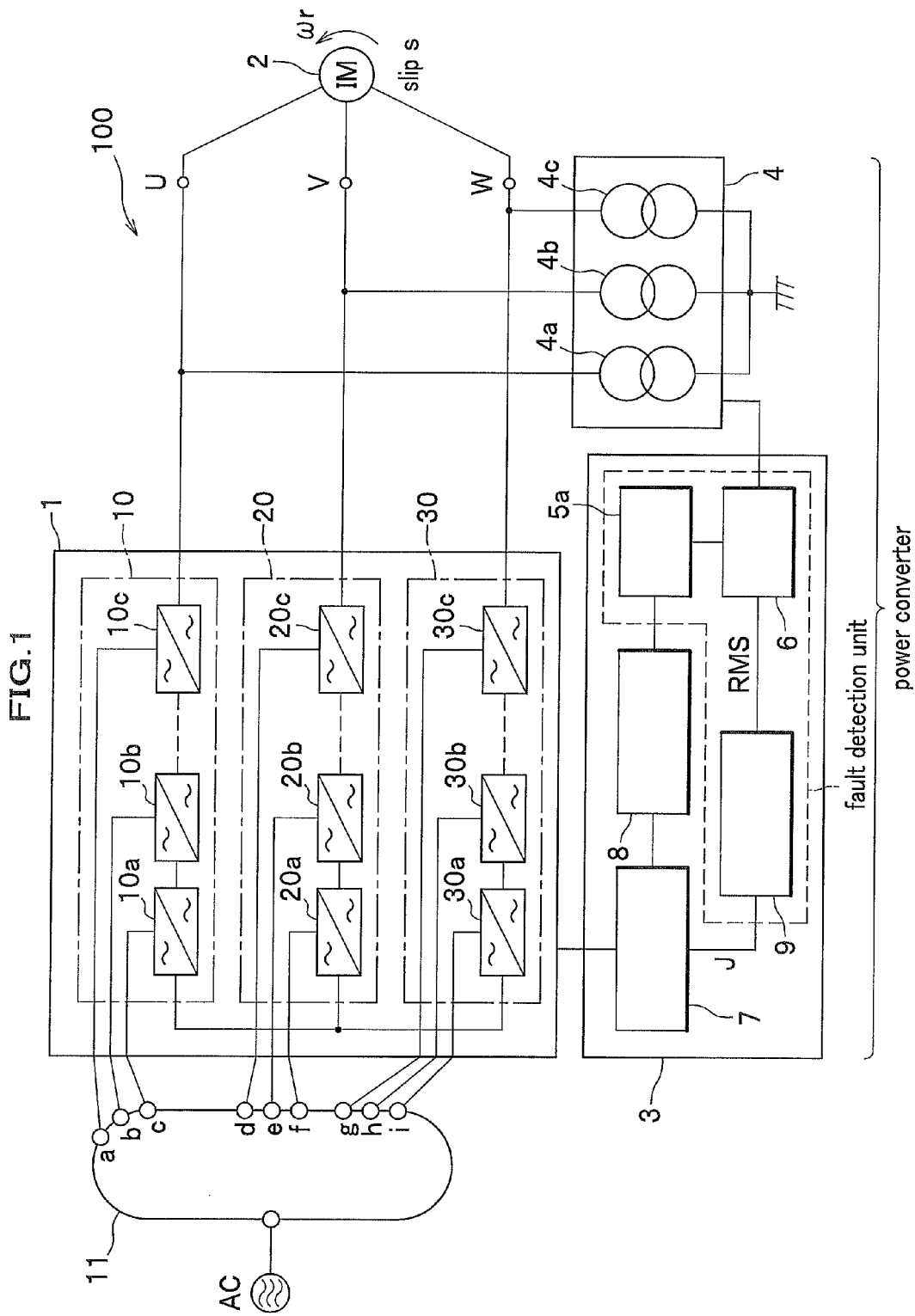
FIG. 1 is a block diagram of a motor driving system of a first embodiment according to the present invention.
Figure 2A:
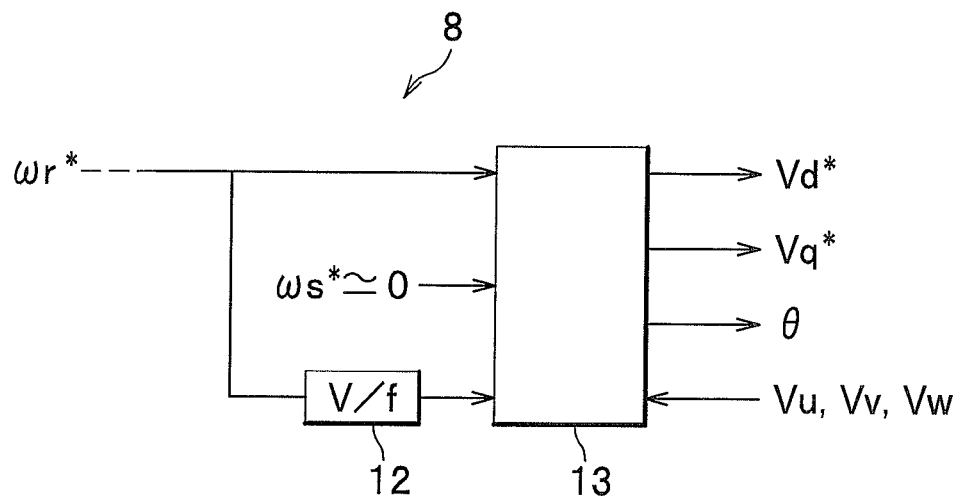
FIG. 2A and FIG. 2B are block diagrams of a frequency instruction value setting circuit and a PWM pulse generator, respectively.

In FIG. 1, a motor driving system 100 includes a multiple transformer 11 whose primary winding is connected to a three-phase alternating current power supply AC; an inverter unit 1 connected to a secondary winding of the multiple transformer 11; a three-phase induction motor 2 connected to the inverter unit 1; an inverter controller 3; and a transformer unit 4 for detecting a voltage applied to the three-phase induction motor 2, in which a rotational speed of the three-phase induction motor 2 is controlled to a target frequency instruction value $\omega_r^*$ (FIG. 2A).

Also, the inverter controller 3 is composed of a CPU (Central Processing Unit), ROM (Read Only Memory), RAM (Random Access Memory), and programs, achieves each function of a PWM pulse generator 7, a frequency instruction value setting circuit 8, a fault detection circuit 9, a voltage deviation monitoring circuit 6, and a deviation voltage calculation circuit 5a, and controls the inverter unit 1 based on a frequency instruction value (speed instruction value $\omega_r^*$ (FIG. 2A)). In addition, a power converter is composed of the inverter unit 1, the inverter controller 3, and the transformer unit 4. Also, a fault detection unit is composed of the deviation voltage calculation circuit 5a, the voltage deviation monitoring circuit 6, and the fault detection circuit 9.

The inverter unit 1 generates a three-phase alternating current power from a plurality of isolated single-phase power supplies (secondary windings a, b, c, . . . of the multiple transformer 11) based on a PWM control signal output from the inverter controller 3, and this three-phase alternating current power drives the three-phase induction motor 2. Also, the inverter unit 1 is provided with a U-phase unit 10, a V-phase unit 20, and a W-phase unit 30, and each of the U, V, W-phase units is composed of multiple connected single-phase cell inverters 10a, 10b, . . . , 20a, 20b, . . . , and 30a, 30b, . . . respectively. In addition, a frequency of the PWM control signal is based on the frequency instruction value $\omega_r^*$ (FIG. 2A).

The multiple transformer 11 is a transformer provided with the primary winding connected to the three-phase alternating current power supply and a plurality of isolated secondary windings a, b, c, . . . , i, and each of the secondary windings a, b, c, . . . , i generates a three-phase alternating voltage respectively. That is, the secondary windings a, b, c are connected to an input side of the U-phase unit 10 as a three phase power supply, the secondary windings d, e, f are connected to an input side of the V-phase unit 20, and the secondary windings g, h, i are connected to an input side of the W-phase unit 30. Also, it is possible to reduce a power supply harmonics in the multiple transformer 11 by shifting a second order phase with a zigzag connection or a Δ-Y connection.

In the three-phase induction motor 2, by a revolving magnetic field generated by applying the three-phase alternating voltage having a PWM controlled primary frequency $\omega_1$ to a stator coil, an induced current (secondary current) having a slip frequency $\omega_S$ passes through a secondary winding, and a rotational torque is generated by an interaction between this induced current and a gap magnetic flux. And, the three-phase induction motor 2 rotates at a rotational speed $\omega_r = \omega_1 - \omega_S$.

Also, when a magnetic flux $\phi = \Phi \sin(\Omega_1 t)$, if a load is light and slip s is small, an applied voltage V of the winding is:

$$V = d\phi/dt = \Omega_1 \Phi \cos(\omega_1 t) \qquad (1).$$

For this reason, a motor (for example, the three-phase induction motor 2) has a general characteristics that the gap magnetic flux $\Phi$ is made to be constant by the fact that the primary frequency $\omega_1$ of the stator current is proportional to the applied voltage V, and that a torque sensitivity to the stator current can be maximized.

The transformer unit 4 is provided with transformers 4a, 4b, 4c, and detects instantaneous values vu, vv, vw of phase voltages output from the U-phase unit 10, the V-phase unit 20, and the W-phase unit 30 of the inverter unit 1. The multiple transformer 11 generates a plurality of isolated three-phase alternating voltages in the secondary windings a, b, c, . . . using the three-phase alternating current power supply AC connected to the primary winding. The number of these three-phase alternating voltages is three times of the number of stages of the U-phase unit 10, the V-phase unit 20, and the W-phase unit 30. For example, when the number of stages of the U-phase unit 10, the V-phase unit 20, and the W-phase unit 30 is three, nine of the three-phase output voltage isolated each other are generated.

With reference to FIGS. 2 and 3, each circuit of the inverter controller 3 will be explained.

A frequency instruction value setting circuit 8 shown in FIG. 2A includes a vector control unit 13 and a V/f gain 12, and generates a d-axis voltage instruction value $V_d^*$, a q-axis voltage instruction value $V_q^*$, and a rotational angle $\theta$ signals from a speed instruction value $\Omega_r^*$ and phase voltages $V_u$, $V_v$, $V_w$ (instantaneous values vu, vv, vw of phase voltages). In addition, a vector sum of the d-axis voltage instruction value $V_d^*$ and the q-axis voltage instruction value $V_q^*$ corresponds to an output voltage of the inverter unit 1.

The vector control unit 13 is input the speed instruction value $\omega_r^*$ as a q-axis signal, estimates the rotational angle $\theta$ of the three-phase induction motor 2 from the phase voltages $V_n$, $V_v$, $V_w$ (or phase currents $I_u$, $I_v$, $I_w$ (not shown)), and generates the d-axis voltage instruction value $V_d^*$ and the q-axis voltage instruction value $V_q^*$. For this reason, the three-phase induction motor 2 rotates at the rotational speed $\omega_r$ with the speed instruction value $\omega_r^*$ as a target value, and the q-axis voltage instruction value $V_q^*$ varies depending on a load torque. Here, assume that a slip frequency instruction value $\omega_S^*$ is zero because the load is light.

Also, the vector control unit 13 is input a value corresponding to the speed instruction value $\omega_r^*$ as a d-axis signal via the V/f gain 12. This V/f gain 12 outputs a signal which is inversely proportional to the speed instruction value $\omega_r^*$. The V/f gain 12 varies a d-axis component (exciting axis component) so that a voltage applied to the three-phase induction motor 2 does not depend on the speed instruction value $\omega_r^*$.

Figure 2B:
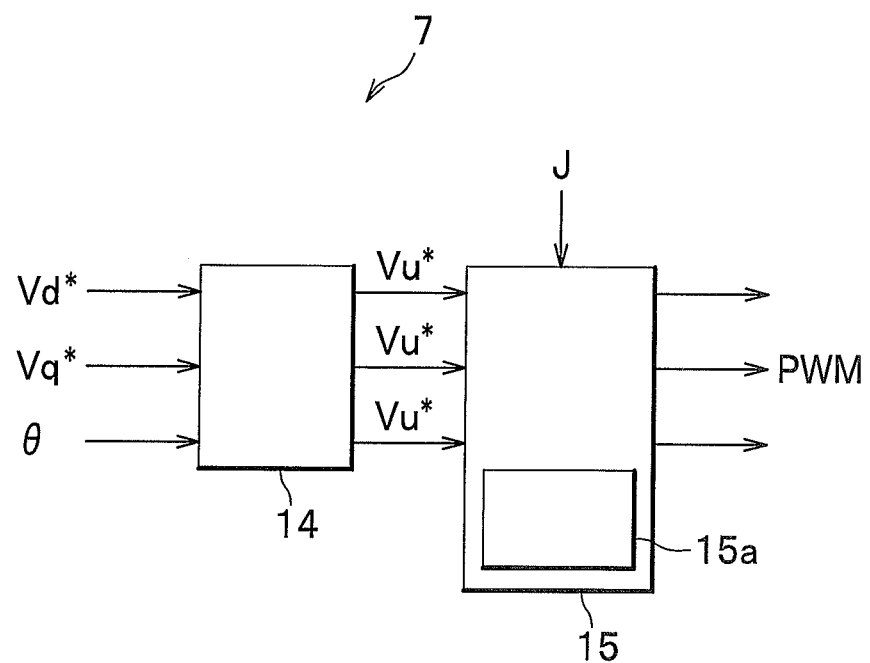

The PWM (Pulse Width Modulation) pulse generator 7 shown in FIG. 2B includes a two-axis/three-phase converter 14 and a PWM converter 15, and generates a three-phase PWM (Pulse Width Modulation) control signal using an output signal of the vector control unit 13. The two-axis/three-phase converter 14 calculates three-phase motor instruction voltages $V_u^*$, $V_v^*$, $V_w^*$ from the d-axis voltage instruction value $V_d^*$, the q-axis voltage instruction value $V_q^*$, and the rotational angle $\theta$. The PWM converter 15 compares the motor instruction voltages $V_u^*$, $V_v^*$, $V_w^*$ with a triangular wave voltage generated by a triangular wave generator 15a to generate a three-phase PWM control signal.

Figure 3A:
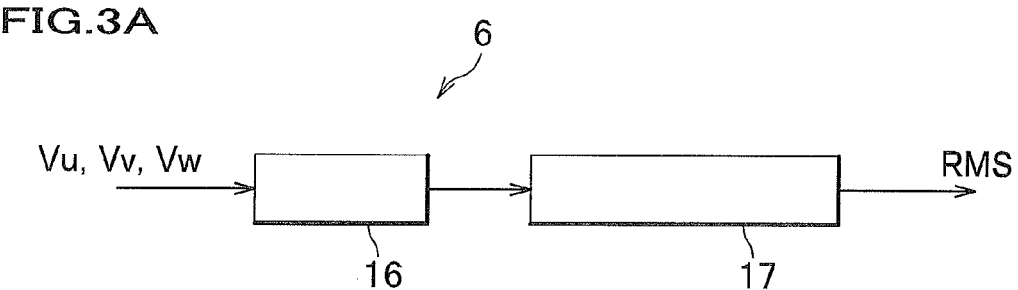
FIG. 3A, FIG. 3B and FIG. 3C are block diagrams of a voltage deviation monitoring circuit, a fault detection circuit, and a deviation voltage calculation circuit, respectively.

The voltage deviation monitoring circuit 6 shown in FIG. 3A includes a FFT calculation unit 16 and a harmonics effective value calculation unit 17, and calculates an effective value RMS (root mean square value) of the phase-to-phase voltage deviation using the phase voltages $V_u$, $V_v$, $V_w$ incorporated by the transformer unit 4. The FFT calculation unit 16 transforms the phase voltages $V_u$, $V_v$, $V_w$ using FFT. The harmonics effective value calculation unit 17 calculates a harmonics effective value rms of each phase voltage using equation (2), and calculates an effective value RMS of the deviation of phase-to-phase voltages ($V_u - V_v$, $V_v - V_w$, $V_w - V_u$) using the harmonics effective value rms. Here, $E_1, E_2, \ldots, E_n$ are amplitude values of a fundamental wave component and each harmonics.

$$rms = \sqrt{(E_1^2 + E_2^2 + E_3^2 + \ldots + E_n^2)} \qquad (2)$$

Figure 3B:
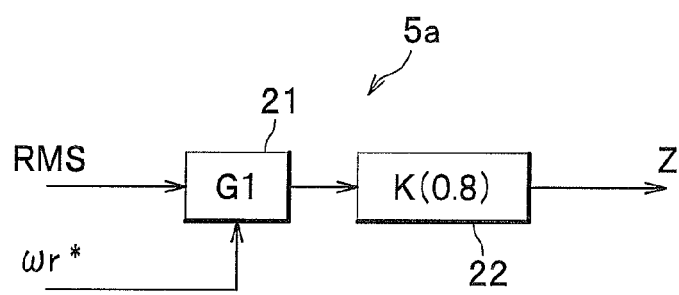

The deviation voltage calculation circuit 5a shown in FIG. 3B includes gains 21 and 22, and calculates a specified output voltage Z from the effective value RMS and the speed instruction value $\omega_r^*$.

The gain 21 outputs a value which is calculated by an inverse calculation of the V/f gain 12 (FIG. 2A) from the effective value RMS of the harmonics component and the speed instruction value $\omega_r^*$.

The gain 22 multiplies the value output from the gain 21 by a predetermined factor $K_1$ (for example, 0.8) and outputs a result as an allowable voltage deviation (specified output voltage Z).

Figure 3C:
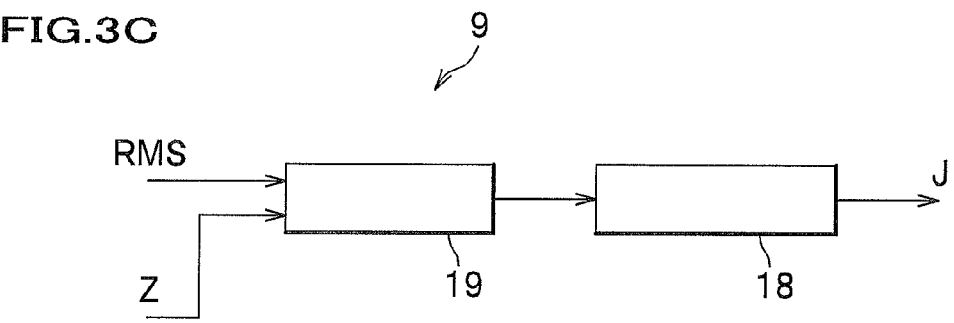

The fault detection circuit 9 shown in FIG. 3C includes a judging unit 19 and a predetermined time measuring unit 18, and outputs a halt instruction J based on the effective value RMS and the specified output voltage Z. The judging unit 19 compares the effective value RMS of the harmonics with the allowable voltage deviation (specified output voltage Z) calculated by the deviation voltage calculation circuit 5a so as to detect a deviation fault. The predetermined time measuring unit 18 detects whether the deviation fault continues for more than the predetermined time so as to output the halt instruction J. Also, this predetermined time is preferably determined depending on an excess voltage which corresponds to a difference between any one of the phase-to-phase voltage deviations and the allowable voltage deviation. Further, the halt instruction J is output to the PWM pulse generator 7 (FIGS. 1 and 2B) so as to holt the operation of the inverter unit 1 (FIG. 1).

Figure 4:
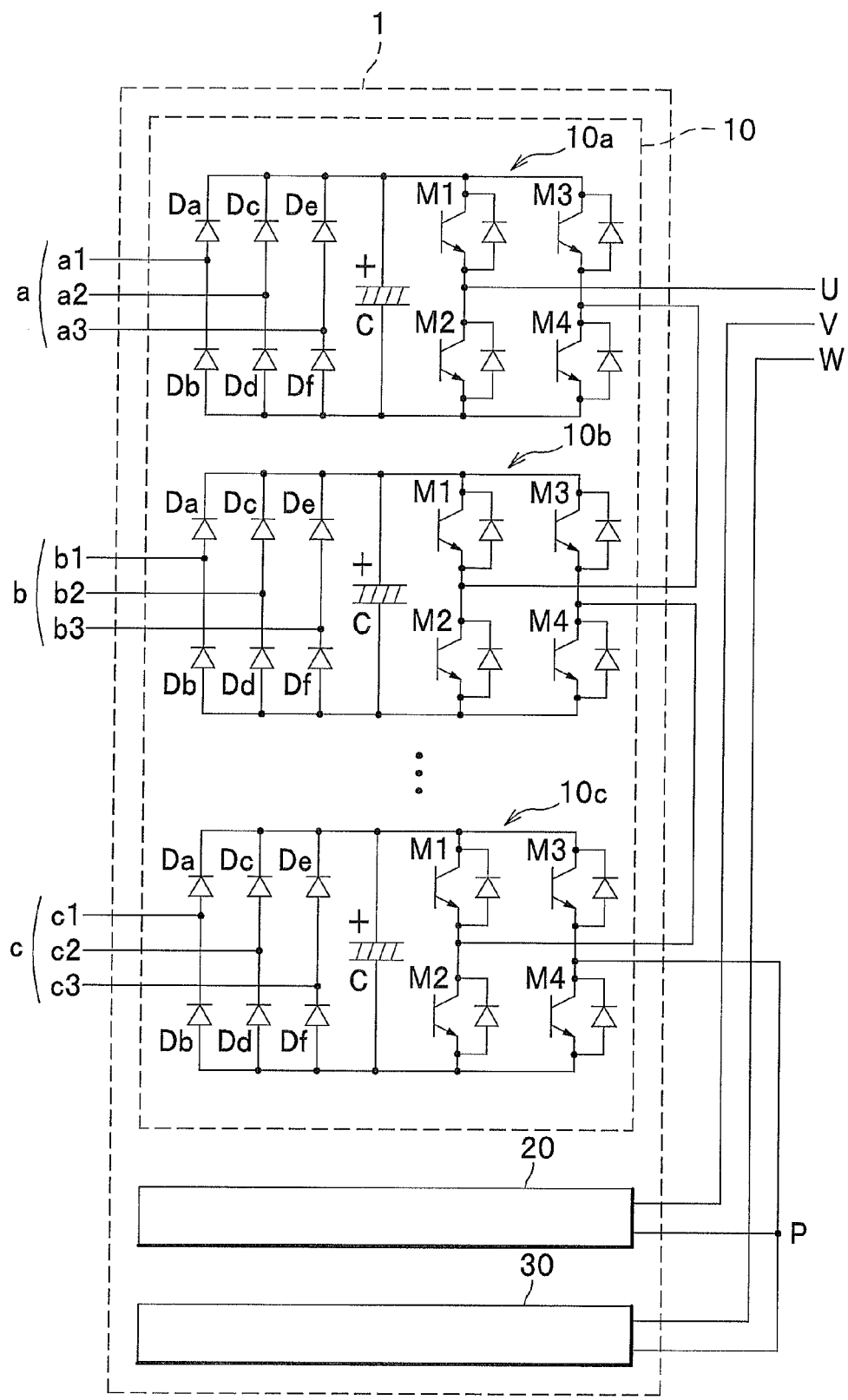
FIG. 4 is a circuit diagram of an inverter unit.

FIG. 4 is a circuit diagram of the inverter unit 1. In FIG. 4, the inverter unit 1 includes the U-phase unit 10, the V-phase unit 20, and the W-phase unit 30, and converts the three-phase alternating current powers output from the plurality of isolated secondary windings a, b, c, . . . , i of the multiple transformer 11 (FIG. 1) to the three-phase alternating current powers. The U-phase unit 10 is composed of multiple connected single-phase cell inverters 10a, 10b, 10c. By multiple connecting the single-phase cell inverters 10a, 10b, 10c, a boosting transformer (an output transformer) can be omitted, and the three-phase induction motor 2 can be driven efficiently. Also, because the output transformer is omitted, space-saving can be made.

The single-phase cell inverter 10a includes rectifying diodes Da, Db, Dc, Dd, De, Df which constitute a three-phase bridge rectifier circuit; smoothing capacitor C; transistors $M_1$, $M_2$, $M_3$, $M_4$ which are IGBTs (Insulated Gate Bipolar Transistor); and freewheeling diodes connected between collectors and emitters of the transistors $M_1$, $M_2$, $M_3$, $M_4$. In addition, the transistors $M_1$, $M_2$, $M_3$, $M_4$ are not limited to the IGBTs. They may be TETs or bipolar transistors. Also, the transistors $M_1$, $M_2$, $M_3$, $M_4$ are controlled by inputting the three-phase PWM control signals into their gates.

A junction point a1 between an anode of the rectifying diode Da and a cathode of the rectifying diode Db, a junction point a2 between an anode of the rectifying diode Dc and a cathode of the rectifying diode Dd, and a junction point a3 between an anode of the rectifying diode De and a cathode of the rectifying diode D1 are connected to a secondary winding a of the multiple transformer 11.

In the single-phase cell inverter 10a, the junction point among the cathodes of the rectifying diodes Da, Dc, De, an anode of a smoothing capacitor C, and a junction point between collectors of the transistors $M_1$ and $M_3$ are connected each other, and the junction point among anodes of the rectifying diodes Db, Dd, Df, a cathode of the smoothing capacitor C, and a junction point between emitters of the transistors $M_2$ and $M_4$ are connected each other. Also, a junction point between an emitter of the transistor $M_1$ and a collector of the transistor $M_2$ in the single-phase cell inverter 10a is connected to a U-phase terminal of the motor 2 (FIG. 1), and a junction point between an emitter of the transistor $M_3$ and a collector of the transistor $M_4$ is connected to a junction point between an emitter of the transistor $M_1$ and a collector of the transistor $M_3$ in the single-phase cell inverter 10b. Also, a junction point between an emitter of the transistor $M_3$ and a collector of the transistor $M_4$ in the single-phase cell inverter 10b is connected to a junction point between an emitter of the transistor $M_1$ and a collector of the transistor $M_2$ in the single-phase cell inverter 10c, and a junction point between an emitter of the transistor $M_3$ and a collector of the transistor $M_4$ is connected to a neutral point P of the U-phase unit 10, the V-phase unit 20, and the W-phase unit 30.

Likewise, the V-phase unit 20 is connected to a V-phase terminal of the three-phase induction motor 2 (FIG. 1), and the W-phase unit 30 is connected to a W-phase terminal of the three-phase induction motor 2 (FIG. 1). Also, the rectifying diodes Da, Db, Dc, Dd in the single-phase cell inverter 10b are connected to single-phase output terminals b (b1, b2, b3) of the multiple transformer 11, and the rectifying diodes Da, Db, Dc, Dd in the single-phase cell inverter 10c are connected to three-phase output terminals c (c1, c2, c3) of the multiple transformer 11.

According to the motor driving system 100 shown in FIG. 1, the inverter unit 1 and the multiple transformer 11 generate three-phase alternating high voltage and drive the three-phase induction motor 2. The inverter unit 1 is composed of multiple connected single-phase cell inverters 10a, 10b, 10c. Therefore, if an open-phase occurs in any one of the single-phase cell inverters, an effective value of the output voltage decreases and a harmonic distortion increases. The open-phase is judged by calculating a harmonics effective value of a deviation voltage of the phase voltage and comparing the harmonics effective value with the allowable voltage deviation (specified output voltage Z). That is, the open-phase is judged only by detecting the phase voltage.

At this time, although the inverter controller 3 controls the inverter unit 1, the inverter controller 3 has a frequency dependency in which output voltages (phase voltages $V_u$, $V_v$, $V_w$) of the inverter unit 1 are proportional to the speed instruction value $\omega_r^*$ so that the gap magnetic flux Φ of the three-phase induction motor 2 is made to be constant in order to maximize the torque sensitivity for the stator current.

For this reason, based on the speed instruction value $\omega_r^*$, the deviation voltage calculation circuit 5a varies a specified judging value (allowable voltage deviation) for the output voltage of the inverter unit 1. As a result, the fault detection circuit 9 can detect the open-phase in all region of the frequency instruction value (speed instruction value $\omega_r^*$).

In addition, in this embodiment, the inverter controller 3 varies a q-axis current in accord with the load torque, the V/f gain 12 (FIG. 2A) adjusts the d-axis current, and the inverter unit 1 outputs a voltage corresponding to the speed instruction value $\omega_r^*$.

(Second Embodiment)

In the first embodiment, the inverter controller 3 calculates the allowable voltage deviation corresponding to the frequency instruction value (speed instruction value $\omega_r^*$). However, the allowable voltage deviation corresponding to a real rotational speed (real frequency) $\omega_r$ of the three-phase induction motor 2 may be calculated.

Figure 5:
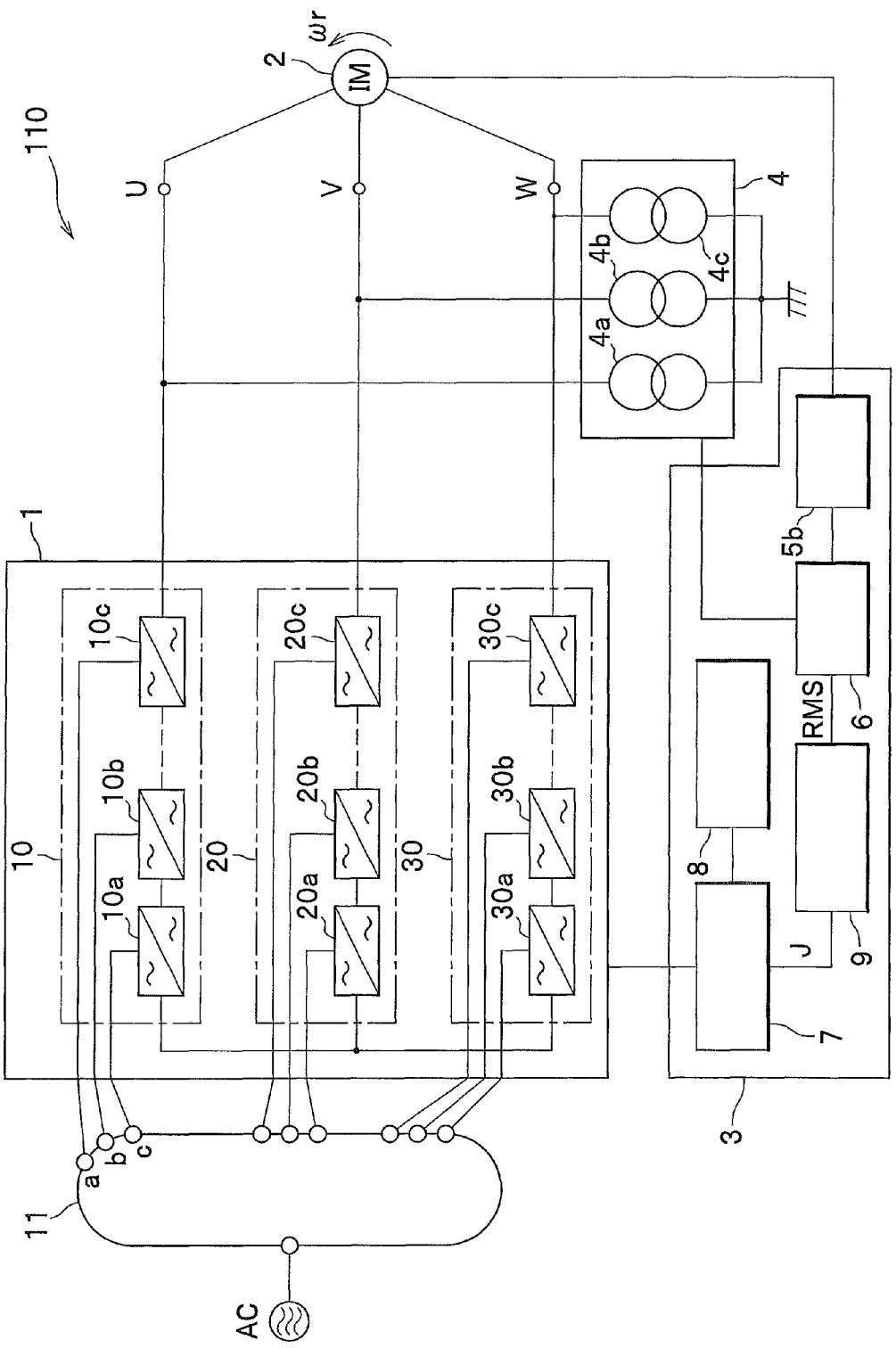
FIG. 5 is a block diagram of a motor driving system of a second embodiment according to the present invention.
Figure 6:
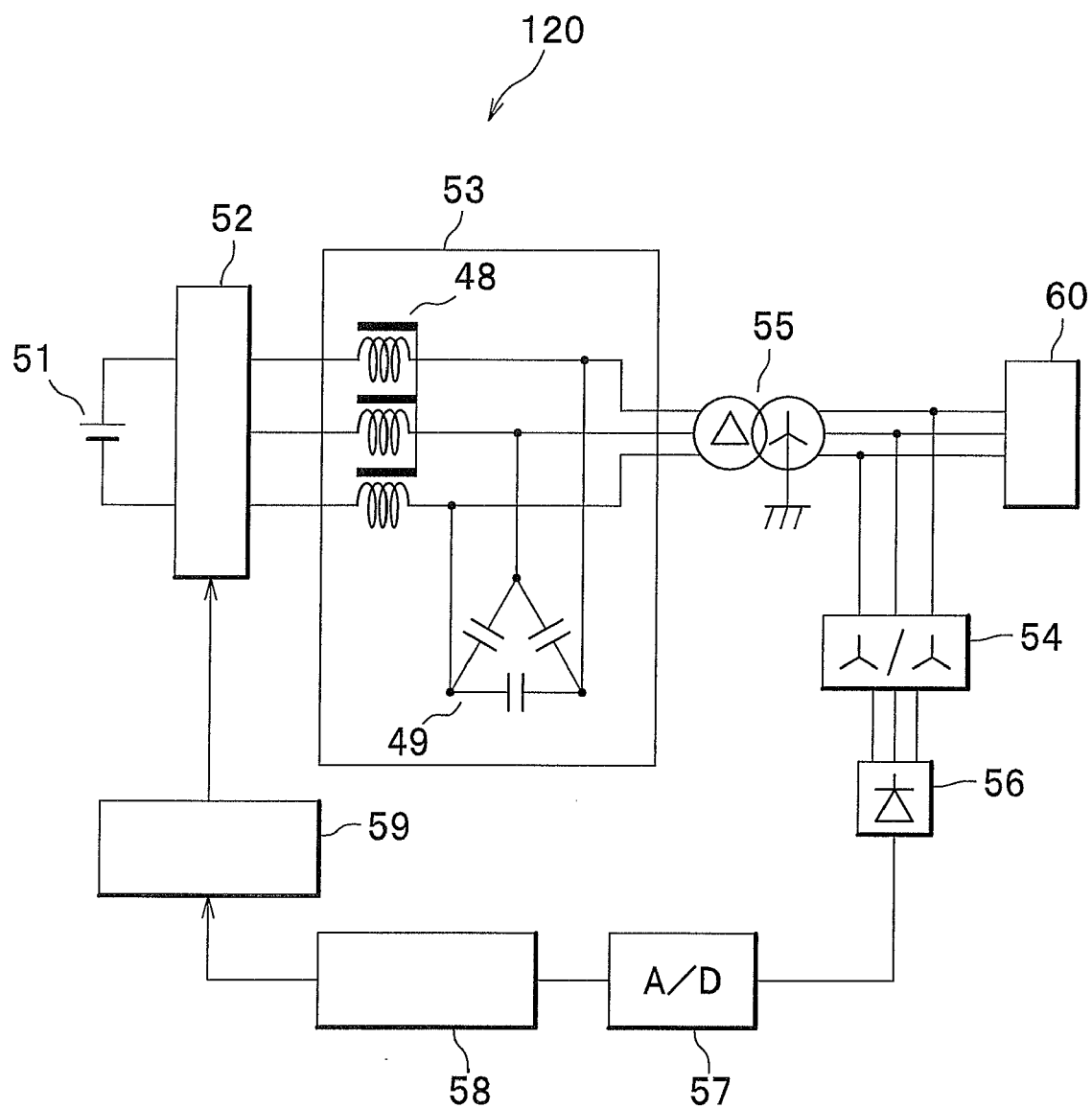
FIG. 6 is a block diagram of an open-phase detecting system described in JP 8-331750 A.

In a motor driving system 110 shown in FIG. 5, a deviation voltage calculation circuit 5b is provided instead of the deviation voltage calculation circuit 5a shown in FIG. 1, the deviation voltage calculation circuit 5b incorporates the rotational speed $\omega_r$ of the three-phase induction motor 2 and calculates the allowable voltage deviation corresponding to the rotational speed $\omega_r$. Also, the voltage deviation monitoring circuit 6 incorporates signals from the transformer unit 4 and the deviation voltage calculation circuit 5b, and monitors whether each of the phase-to-phase voltage deviations is out of the allowable range.

According to the motor driving system 110 shown in FIG. 5, the fault detection circuit 9 detects the open-phase by incorporating each of the phase voltages detected by the transformer unit 4 and the allowable voltage deviation corresponding to the real rotational speed $\omega_r$ of the three-phase induction motor 2. In addition, when the load of the three-phase induction motor 2 is light and a slip s is small, the rotational speed $\omega_r$ is nearly equal to the speed instruction value $\omega_r^*$.

(Third Embodiment)

The deviation voltage calculation circuit 5a incorporates the speed instruction value $\omega_r^*$ in the first embodiment, and the deviation voltage calculation circuit 5b incorporates the rotational speed $\omega_r$ of the three-phase induction motor 2 in the second embodiment. However, when the load is light and the slip s is small, a frequency $\omega$ of a driving voltage applied to the three-phase induction motor 2 can be incorporated. In this case, instantaneous values vu, vv, vw of the phase voltages detected by the voltage deviation monitoring circuit 6 are zero-cross detected so as to detect the frequency $\omega$. Using this detected frequency $\omega$, the gain 21 of the deviation voltage calculation circuit 5a is determined.

According to this embodiment, when a plurality of open-phase occur in the plurality of phase unit inverters 10, 20, 30 each of which is composed of the plurality of single-phase cell inverters 10a, 10b, 10c, . . . due to faults in the plurality of single-phase cell inverters, the open-phase can be detected in all operating regions of the inverter unit 1 by calculating the phase-to-phase voltage deviation as a value which depends on a frequency.

(Modification)

The present invention is not limited to the above described embodiments. For example, the following modifications can be made.

(1) Although the inverter unit 1 is PWM controlled in each of the embodiments, each of the single-phase cell inverters 10a, 10b, . . . , 20a, 20b, . . . may be PWM controlled as a two-level inverter, or may be PWM controlled as a three-level inverter.

(2) In the first embodiment, the open-phase is judged by analyzing the phase voltage using FFT so as to obtain the harmonics component and by comparing the effective value RMS of the phase-to-phase voltage deviation with a reference value of the deviation voltage. However, the open-phase is also judged by dividing the harmonics effective value rms of the phase voltage by a fundamental wave component $E_1$ so as to obtain a distortion factor K of each phase voltages and by using the distortion factor K.

(3) In each of the above described embodiments, the multiple transformer 11 outputs the plurality of isolated three-phase alternating voltages by connecting the three-phase alternating current power supply AC to the primary winding. However, a single-phase alternating current power supply may be connected to the primary winding. In this case, the single-phase bridge rectifier circuit in which four diodes are used is used for the U-phase unit, the V-phase unit, and the W-phase unit.

(4) In each of the above described embodiments, the inverter controller 3 controls the inverter unit 1 so that the output voltage is proportional to the frequency (frequency instruction value $\omega_r^*$, real rotational speed $\omega_r$). However, the present invention is not limited to the above. The output voltage of the inverter unit 1 needs only to have a frequency dependency.

(5) In each of the above described embodiment, the inverter unit 1 is PWM controlled to apply the rectangular three-phase alternating voltage to the three-phase induction motor 2. However, a sinusoidal alternating voltage may be applied to the three-phase induction motor 2 via a alternating current filter.

In this case, because the transformer unit 4 detects the sinusoidal alternating voltage, the FFT calculation unit 16 and the harmonics effective value calculation unit 17 in the voltage deviation monitoring circuit 6 (FIG. 3A) can be omitted. That is, the voltage deviation monitoring circuit 6 calculates the effective value RMS of each phase by multiplying the amplitude value by $1/\sqrt{2}$.

(6) In each of the above described embodiments, the three-phase induction motor 2 is used. However, equation (1) generally holds in motors. Therefore, even a synchronous motor can detect the open-phase. In this case, there is no need to consider the slip s. And even if a q-axis current instruction value $I_q^*$ which is proportional to the load torque is nearly equal to zero, the voltage applied to the synchronous motor can be kept constant by increasing the d-axis current instruction value $I_d^*$.

What is claimed is:

1. A power converter comprising:
an inverter unit having phase unit inverters provided with a plurality of multiple connected single-phase cell inverters for every phase;
an inverter controller for controlling the inverter unit so that a predetermined relation is kept between an output voltage and a frequency; and
a plurality of transformers for detecting output voltages of the plurality of phase unit inverters,
wherein the inverter controller is provided with a fault detection unit for detecting whether a phase-to-phase voltage deviation calculated by the output voltage is within a range of an allowable voltage deviation calculated as a function of the frequency.

2. The power converter according to claim 1, wherein the fault detection unit comprising:
a voltage deviation monitoring circuit for monitoring an effective value of each phase voltage;
a deviation voltage calculation circuit for calculating an allowable voltage deviation as a function of the frequency; and
a fault detection circuit for halting the inverter unit when a phase-to-phase voltage deviation calculated from the effective value of each of the phase voltage exceeds the allowable voltage deviation for more than a predetermined time.

3. The power converter according to claim 2, wherein the frequency is a frequency instruction value for defying a PWM control signal sent from the inverter controller to the inverter unit, and
the allowable voltage deviation of each of the phase-to-phase voltages is calculated as a function of the frequency instruction value.

4. The power converter according to claim 2, wherein the inverter unit is connected to a motor,
the frequency is the frequency instruction value which is a target rotational speed of the motor, and
the allowable voltage deviation of each of the phase-to-phase voltages is calculated as a function of the frequency instruction value.

5. The power converter according to claim 3, wherein
the predetermined time is determined depending on the frequency instruction value.

6. The power converter according to claim 2, wherein
the predetermined time is determined depending on an excess voltage which corresponds to a difference between any one of the phase-to-phase voltage deviations and the allowable voltage deviation.

7. The power converter according to claim 2, wherein
the inverter unit is connected to a motor,
the frequency depends on the rotational speed of the motor, and
the allowable voltage deviation of each of the phase-to-phase voltages is calculated for the rotational speed.

8. The power converter according to claim 7, wherein
the predetermined time is defined depending on the rotational speed of the motor.

9. The power converter according to claim 2, wherein
the allowable voltage deviation of each of the phase-to-phase voltages is calculated as a function of an output frequency of the inverter unit.

10. The power converter according to claim 9, wherein
the predetermined time is determined depending on an excess voltage which corresponds to a difference between any one of the phase-to-phase voltage deviations and the allowable voltage deviation.

11. The power converter according to claim 9, wherein
quick response is achieved by setting a ratio of an output voltage to a deviation small in a high frequency region, and a detection error is suppressed by setting the ratio of the output voltage to the deviation large in a low frequency region.

12. The power converter according to claim 1, wherein
the phase unit inverter comprises the single-phase cell inverter which is a two or three-level.

13. The power converter according to claim 1, wherein
the predetermined relation is that the output voltage is proportional to the frequency.

14. A motor driving system comprising:
a multiple-outputs transformer provided with a primary winding connected to an alternating current power supply and a plurality of isolated secondary windings;
an inverter unit whose input side is connected to the secondary winding and whose output side is provided with phase unit inverters provided with a plurality of multiple connected single-phase cell inverters for every phase;
a motor connected to the inverter unit;
an inverter controller wherein a voltage applied to the motor via the inverter unit has a frequency dependency; and
a transformer for detecting an instantaneous voltage wave form of each voltage of the motor, wherein
the inverter controller further comprises a fault detection unit for detecting whether a transformed voltage which is obtained by transforming the phase voltage in terms of the frequency is within an allowable range.

15. The motor driving system according to claim 14, wherein
the frequency is a frequency instruction value of a PWM control signal sent from the inverter controller to the inverter unit, and
an allowable voltage deviation of each of phase-to-phase voltages is calculated for the frequency instruction value.

* * * * *